United States Patent
Graf

(10) Patent No.: US 6,923,103 B2
(45) Date of Patent: Aug. 2, 2005

(54) MACHINE FOR THE CONTINUOUS MULTI-STROKE SLOTTING OF PLATE-SHAPED WORKPIECES

(75) Inventor: Daniel Graf, Ditzingen (DE)

(73) Assignee: Trumpf Werkzeugmaschinen GmbH + Co KG, Ditzingen (DE)

( * ) Notice: Subject to any disclaimer, the term of this patent is extended or adjusted under 35 U.S.C. 154(b) by 0 days.

(21) Appl. No.: 10/958,462

(22) Filed: Oct. 5, 2004

(65) Prior Publication Data

US 2005/0045014 A1 Mar. 3, 2005

Related U.S. Application Data

(62) Division of application No. 10/309,917, filed on Dec. 4, 2002.

(30) Foreign Application Priority Data

Dec. 6, 2001 (EP) .............................................. 01128464

(51) Int. Cl.[7] .............................................. B21D 28/26
(52) U.S. Cl. ................................ 83/530; 83/49; 83/689
(58) Field of Search .......................... 83/237, 530, 636, 83/682, 684, 689, 916, 917, 35, 36, 39, 49, 52, 56

(56) References Cited

U.S. PATENT DOCUMENTS

| 4,674,373 A | 6/1987 | Kuppinger |
| 4,738,173 A | 4/1988 | Kiuchi |
| 4,981,058 A | 1/1991 | Gavrun, III |
| 5,195,413 A | 3/1993 | Johnson |
| RE34,602 E | 5/1994 | Naito et al. |
| 5,400,682 A | 3/1995 | Matsuura |
| 5,499,566 A | 3/1996 | Endo et al. |
| 5,988,032 A | 11/1999 | Seki |

FOREIGN PATENT DOCUMENTS

| JP | 62263830 | * 11/1987 |
| JP | 63130227 | * 6/1988 |

* cited by examiner

*Primary Examiner*—Stephen Choi
(74) *Attorney, Agent, or Firm*—Peter L. Costas; Pepe & Hazard LLP

(57) ABSTRACT

A machine for the multi-stroke, continuous slotting of plate-shaped workpieces and especially sheet metal plates is described. A slotting tool (16) and the workpiece are movable in a forward direction relative to each other in a gate-cutting function and in at least one subsequent slot cutting stroke. This is followed by a return movement in the opposite direction (32) over a return length (A) that corresponds at a maximum to the length of the previously laterally cut slot. This is followed by a cross-cutting stroke in which the strip of material (31) that was laterally cut in the gate-cutting function and the minimum of one subsequent slotting stroke is severed at a distance from the point of its connection to the remaining workpiece. The slotting tool (16) is driven by a cam drive with a drive control, a return-drive system with a return-drive control and a forward-feed drive system with a feed-drive control. These control devices serve to control the slotting tool (16), the return-drive and feed-drive systems of the machine tool.

6 Claims, 7 Drawing Sheets

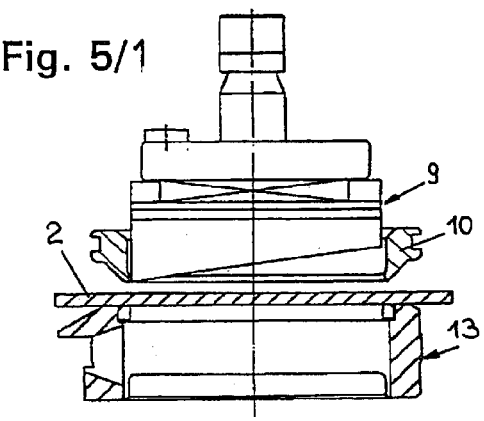
Fig. 5/1
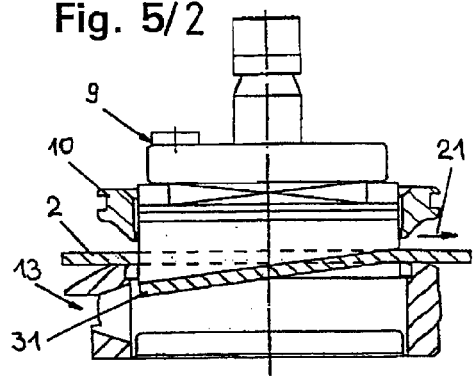
Fig. 5/2
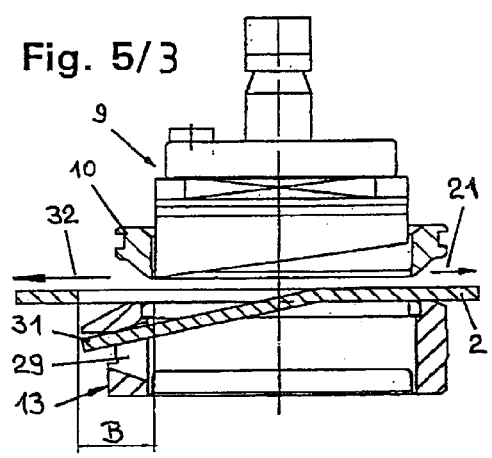
Fig. 5/3
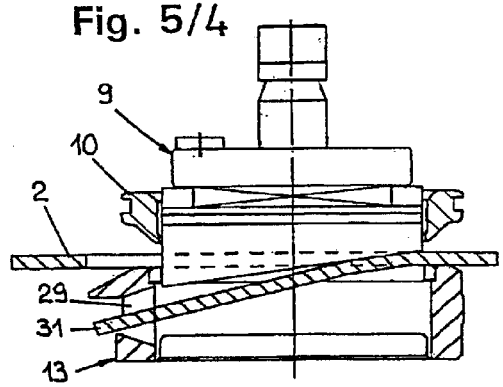
Fig. 5/4
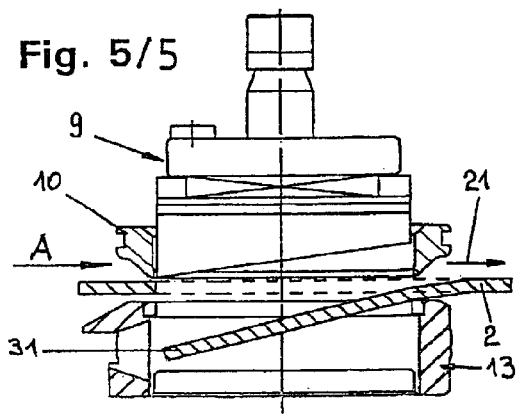
Fig. 5/5
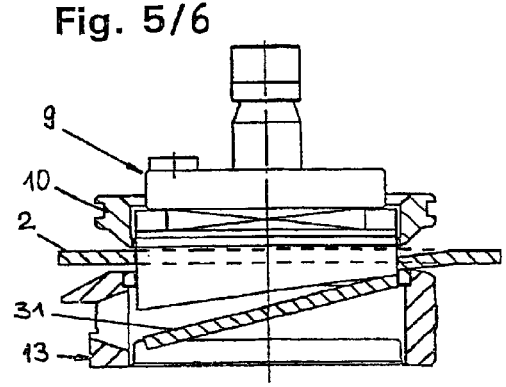
Fig. 5/6

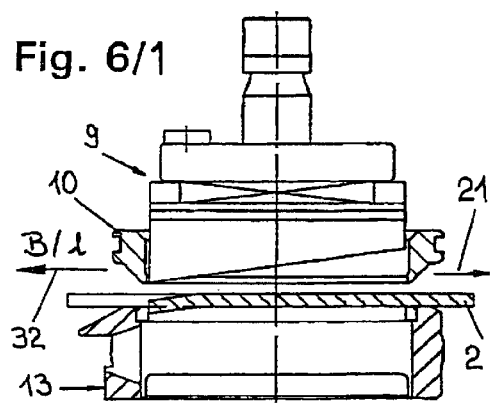
Fig. 6/1
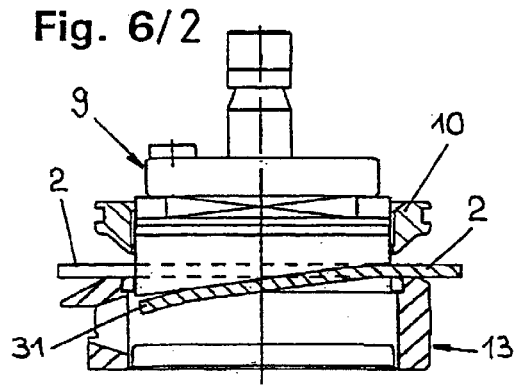
Fig. 6/2
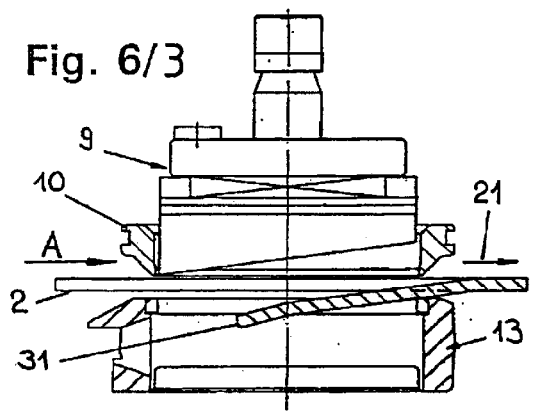
Fig. 6/3
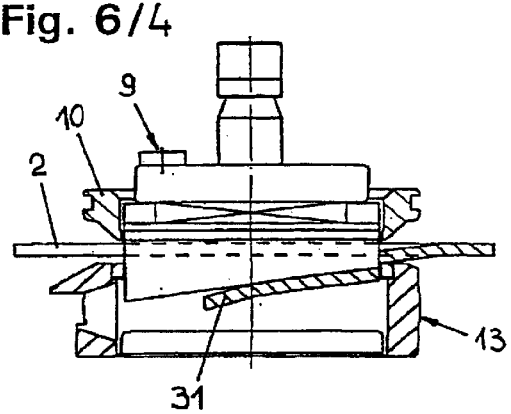
Fig. 6/4
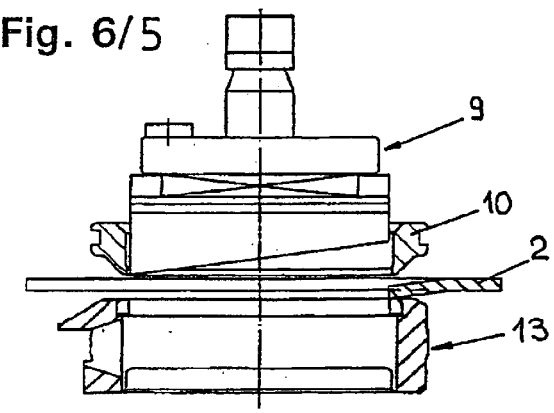
Fig. 6/5

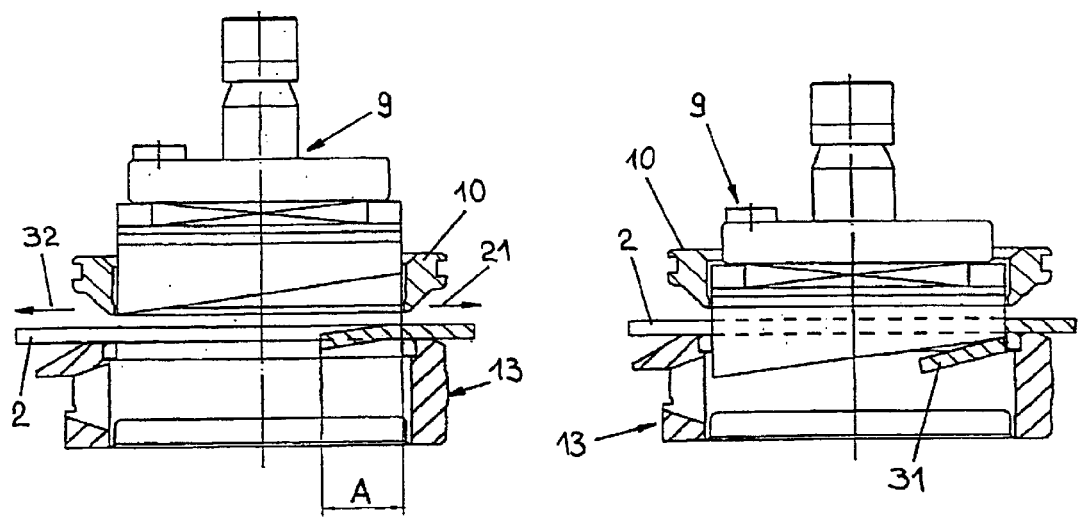
Fig. 7/1              Fig. 7/2
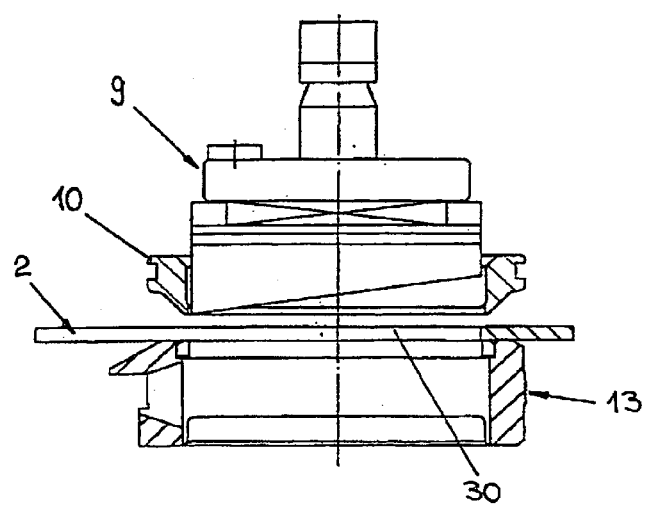
Fig. 7/3

MACHINE FOR THE CONTINUOUS MULTI-STROKE SLOTTING OF PLATE-SHAPED WORKPIECES

CROSS REFERENCE TO RELATED APPLICATION

The present application is a division of U.S. application patent Ser. No. 10/309,917 filed Dec. 4, 2002.

BACKGROUND OF THE INVENTION

This invention relates to a machine and tooling for the continuous multi-stroke cutting of slots in flat, plate-shaped workpieces, especially sheet metal, by means of a slotting tool comprising two tool sections that are positioned on opposite sides of the workpiece and each provided with two longitudinal cutting edges which extend in the direction of the slot and transverse cutting edges at their longitudinal ends.

The longitudinal cutting edges on one tool section are sloped in the direction of the slot along an incline relative to the workpiece whereby, in the course of the process, the tool sections are moved relative to each other in the transverse direction of the workpiece and the slotting tool and the workpiece are moved relative to each other in the forward direction and, in their relative movement, the tool sections as shown perform operations in the form of slotting motions and at least one cross-cut or clipping stroke or motion so that, by means of the tool sections, each slotting motion cuts a strip of material that leaves a stem i.e., a connection at the slot ends with the remainder of the workpiece. This stem is then severed in a cross-cutting stroke by the same tool sections, and a gate-slotting function produces an end gate at a distance from the edge of the workpiece. The gate-slotting stroke is followed, prior to the cross-cutting stroke, by at least one slotting stroke and, in the process of the gate-slotting function and the slotting stroke following it, the workpiece is slotted over a length that exceeds the slot length maximally attainable in the cross-cutting stroke while, between the relative motions of the tool sections, the workpiece and the slotting tool are moved relative to each other by at least one forward increment in the feed direction.

The invention further relates to a machine for the multi-stroke, continuous slotting of plate-shaped workpieces, especially sheet metal, employing a slotting tool and a feed system by means of which the slotting tool and the workpiece are moved relative to each other in the forward direction and under control by a feed control unit. The slotting tool comprises two tool sections that are positioned on opposite sides of the workpiece and each is provided with two longitudinal cutting edges which extend in the direction of the slot and feature at their longitudinal ends transverse cutting edges extending between them. The longitudinal cutting edges on one tool section are inclined in the direction of the slot relative to the workpiece, and, by means of a cam drive controlled by a motion control unit, the tool sections can be moved relative to each other in the transverse direction of the workpiece by motions in the form of slotting strokes and at least one cross-cut clipping stroke or motion so that, by means of the tool sections, each slotting stroke cuts a strip of material that leaves a stem, i.e., a connection, at the slot end with the remainder of the workpiece. This stem is then severed in the cross-cutting motion by the same tool sections, while a gate-slotting function can produce a gate at one end of the slot which is spaced a distance from the edge of the workpiece. This gate-slotting stroke is followed, prior to the cross-cutting stroke, by at least one more slotting motion and, in the process of the gate-slotting stroke and the slotting stroke following it, the workpiece can be slotted over a length that exceeds the slot length maximally attainable in the cross-cutting stroke while, between the strokes of the tool sections, the workpiece and the slotting tool can be moved relative to each other by at least one forward increment in the feed direction.

When slotting plate-shaped workpieces and especially sheet metal, a great deal of significance is often attributed to obtaining cuts free from tool marks. Such high-quality cuts are currently produced by means of a method and a machine of the type described in U.S. Reissue Pat. No. 34,602. In that prior art approach, the slotting tool employs tool sections consisting of, on the top side of the workpiece to be processed, an upper die or punch that can be moved in the transverse direction of the workpiece and, cooperating with it, a lower die or swage positioned underneath the workpiece, and the lower die remains immobile in the transverse direction of the workpiece. Longitudinal cutting edges of the upper die are arched upwardly relative to the plane of the workpiece in the direction of the slot. For cutting a gate within the surface of the workpiece, the upper die is moved downwardly into the lower die or swage over a stroke length so gauged that, viewed in the direction of the slot, the rearward transverse cutting edge of the upper die moves past the corresponding transverse cutting edge of the swage, thus punching out the transverse rear end of the slot to be produced.

Apart from that cross cut, the gating cut also defines the initial part of the longitudinal boundaries of the slot. In the gating cut, the forward transverse cutting edge of the upper die, as viewed in the direction of the slot, is offset in height relative to the rearward transverse cutting edge and remains above the workpiece. Thus, as the gate cut is made, a strip of material is punched out laterally while its forward end in the direction of the slot is connected to the remaining body of the workpiece. Slotting strokes following the gate-cutting function extend the length of the strip of material. Accordingly, as a function of the selected cutting depth of the upper die along the swage, the forward stem connecting the strip of material to the remaining body of the workpiece is not severed. The arched shape of the longitudinal cutting edges of the upper die causes the laterally cut strip of material to be deflected into the inside of the swage. Transversely punching out the forward end of the finished slot severs the remaining connection between the strip of material and the body of the workpiece. To that effect the upper die or punch in its final motion is moved downwardly into the lower die swage deep enough for its forward transverse cutting edge to move past the corresponding transverse cutting edge of the swage.

In the case of the prior art approach as shown in U.S. Pat. No. Re. 34,602, severing the strip of material prior to the final motion of the upper die, i.e. before the cross-cutting stroke that finishes the slot, would be possible only if one can accept a lesser quality of the cutting surface. This is because, after the cross-cut is made, a lengthening of the slot would make it necessary for the tool sections to make a movement starting from a transverse slot end without any lateral cut. Experience has shown that, in any such case, undesirable tool marks are produced on the longitudinal sides of the slot at the starting point of that movement. It follows that, with the aforementioned process and the aforementioned machine, high-quality cuts are attainable only if one single cross-cut or clipping stroke is made, and that as the final motion. But severing, i.e. clipping, the punched out strip of material only when the final stroke is made can negatively affect the functional reliability of the slotting process and of the slotting tool itself. As a result, continuous multi-stroke slotting produces lengths of strips of material that make it difficult to accommodate lengthwise punched strips of material in the slotting tool in a manner that would not impede continued slotting.

A different type of method and a different type of slotting device are disclosed in U.S. Pat. No. 5,400,682. In that prior art system, the tool sections of the slotting tool consist of a bottom die or swage and, cooperating with it, two upper dies or punches. One of the two upper dies punches longitudinal slots into the workpiece, leaving a strip of material connected with the remainder of the workpiece at the forward end of the slot. The sole purpose of the second upper die is to sever the connecting stem between the strip of material and the body of the workpiece. In one variation of the method and machine design described in U.S. Pat. No. 5,400,682, the strip of material is clipped at a distance from its connecting point to the body of the workpiece. While this prevents tool marks on the longitudinal cutting surfaces of the slot thus produced, it requires a slotting tool that is complex in its mechanical design and in terms of control, that being a slotting tool with two separate, independently operated dies. After the gating slot stroke, the die or punch as shown performing that function is lifted into a position above the workpiece. The die remains in that position both during the return movement of the workpiece following the gating cut and during the ensuing cross-cutting operation. In that prior art machine, the length of the return travel is therefore independent of the upper die that executes the slotting motions.

It is the objective of this invention to advance the state of the art in U.S. Pat. No. RE. 34,602 in a manner that enhances the functional reliability of the earlier machine design while ensuring cut surfaces of high quality.

Another object is to provide a computer controlled slotting machine which performs reliably and rapidly to produce clean slots without moving the workpiece.

SUMMARY OF THE INVENTION

It has now been found that the foregoing and related objects may be readily attained in a machine for the continuous multi-stroke slotting of flat, plate-shaped workpieces in which there is provided a slotting tool (16, 36) having two tool sections (9, 13; 37) positioned on opposite sides of the workpiece (2) and each including two longitudinal cutting edges (22, 25) which extend in the slot direction (21). Transverse cross-cutting edges (23, 24; 26, 27) extend between their longitudinal ends, and the longitudinal cutting edges (22) on one tool section (9) are sloped in the slot direction (21) along an incline relative to the workpiece (2).

The tool sections (9, 13; 37) are movable relative to each other to provide a gate-slotting stroke in which the workpiece is cut along the longitudinal edges and along one transverse cutting edge to provide a gate. The workpiece (2) and the slotting tool (16, 36) are movable relative to each other in the forward direction (32) and the tool sections (9, 13) are movable relative to each other to perform operations in the form of slotting strokes and including at least one cross-cutting stroke so that, by means of the tool sections (9, 13, 37), each slotting stroke laterally cuts a strip of material (31) and leaves a stem connecting it in the slot direction (21) with the remainder of the workpiece (2). The stem is then severed in a cross-cutting stroke by the same tool sections (9, 13, 37).

The gate-slotting stroke producing a gate at a distance from the edge of the workpiece and is followed by a minimum of one slotting stroke. The gate-slotting stroke and at least one following slotting stroke provide a slot in the workpiece having a length that exceeds the slot length (1) maximally attainable in the cross-cutting stroke.

Following the gate-cutting stroke and at least one subsequent slotting stroke, the slotting tool (16, 36) and the workpiece (2) are movable relative to each other in a return movement opposite the advance direction (32) over a return length (A) that corresponds at a maximum to the slot length between the trailing cross-cutting edge (24, 27), as viewed in the slot direction (21), of the tool sections (9, 13) and the rearward transverse boundary of the previously laterally cut section of the slot (30). Thereafter, prior to the final stroke finishing the slot (30), executing a cross-cut stroke is executed to provide a clean cut slot of the desired length in the workpiece.

The combination of the gate-cutting function and the minimum of one subsequent slotting stroke are effected by moving the workpiece (2) and the slotting tool (16, 36) relative to each other at least once with a forward movement in the advance direction (32) by a feed length (B) that corresponds to the return length (A) of the subsequent return movement prior to a cross-cutting stroke. The return length (A) is defined as a function of the thickness (d) of the workpiece (2) to be slotted and of the angle at which the longitudinal cutting edges (22) on one of the tool sections (9) extends relative to the workpiece (2).

The return length (A) may be determined by the equation $$A \geq \frac{1/4 d}{\tan \alpha}$$

where
A=the return length,
d=the thickness of the metal plate and
α=the angle of inclination of the longitudinal cutting edges (22) on one tool section (9) at which the longitudinal cutting edges (22) slope upwardly relative to the workpiece (2) in the slot direction (21).

The return length (A) may also be determined by the equation $$A = \frac{2/3 d}{\tan \alpha}$$

where
A=the return length,
d=the thickness of the metal plate and
α=is the angle of inclination of the longitudinal cutting edges (22) on one tool section (9) at which the longitudinal cutting edges (22) slope upward relative to the workpiece in the slot direction (21).

The machine tool for the continuous multi-stroke slotting of plate-shaped workpieces for performing the method includes the combination comprising a workpiece support, and a slotting tool (16, 36) as described above.

A first drive system moves the upper slotting tool section relative to the lower slotting tool section and includes a stroke controlled cam drive (8). A second drive system (19) moves the slotting tool (16, 36) and the workpiece (2) relative to each other in an advance direction (32). A drive control for the drive systems provides the instructions operating the drive systems to perform the various strokes as described hereinbefore.

Desirably, the lower tool section has a wall with an exit port (29) into which the strip of material (31) being laterally cut out in the slotting strokes protrudes. The lower tool section (13) is attached to a tool-section mount (14) positioned opposite the tool-section mount (14) so that the exit port (29) for the strip of material (31) in the wall (28) of the tool section (13) clears the tool-section mount (14).

In operation, the mutually relative return movement of the slotting tool and the workpiece prior to the cross-cutting stroke causes the strip of material laterally cut out during the preceding gate-slotting function and a minimum of one following slotting stroke to be severed by the cross-cutting stroke at a distance from the point where it was still attached to the body of the workpiece. Thus, when another stroke is needed to extend the slot after the cross-cut was made, the slotting tool can engage at any point of the bilaterally cut-out strip of material. This avoids tool marks at the point of tool engagement that would otherwise compromise the surface quality about the cuts made. In the case of the method and the equipment according to this invention the slotting and cross-cutting operations are performed by one and the same set of tool sections and the slots created originate within the workpiece, and particular attention must be paid to the gating phase. In the gate-slotting function and the minimum of one subsequent slotting stroke a strip of materials is cut out laterally, leaving it connected in the forward direction of the slot to the remaining body of the workpiece. Following the gate cutting function and at least one subsequent slotting stroke, that connection is then severed by a cross-cutting stroke. In that cross-cutting stroke, both the leading and the trailing transverse cutting edges of the tool sections pass one another in the transverse direction of the workpiece. This necessitates the avoidance of any undesirable rearward extension of the slot from its gating or starting point.

Therefore, steps must be taken to make certain that during the cross-cut the trailing cutting edges of the tool sections pass each other inside the previously cut-out region of the slot. According to the present invention, this is ensured by the adaptation of the return travel distance to the slot length of the region previously cut out behind the trailing transverse cutting edges, as viewed in the direction of the slot to be produced. Within the boundaries set by that condition, both the slot length laterally cut out in the gating process and in the minimum of one subsequent slotting motion and the return-travel distance of the return movement prior to the cross-cutting stroke can be selected as needed. In any event, the first cross-cutting stroke can take place before the final stroke that completes the slot. This in turn makes it possible to limit the length of the cut-out strip of material from the very beginning. This prevents strip lengths that would potentially impede the slotting process.

The mode in which, after the first cross-cut, the tool sections carry out the slot extension or completion depends on the processing requirements in each particular case. Conceivably, for instance when slots are to be produced that extend from within the workpiece to the edge of the workpiece, the cross-cut made after the gating phase need merely be followed by one or several slotting motions. Significantly, it is possible in that case for the final stroke to be in the form of a slotting motion.

In the variants of this invention, the feed length of at least one forward movement prior to the cross-cut equals the return distance of the subsequent pre-crosscut return movement. The identical path length of these movements has certain control related advantages. The return distance of the return movement before any cross-cut both during the gating phase and any subsequent processing phase is of key importance for optimizing the slotting process. On the one hand, the return distance must be sufficiently large to allow the strip of materials to be clipped in the cross-cut stroke that follows the return movement without leaving undesirable tool marks on the longitudinal slot boundaries. On the other hand, the return distance must not be too large. While an excessive return distance would ensure that in the cross-cut stroke that follows the return movement the tool sections would sever the strip of material from its connection with the remaining workpiece with sufficient clearance from that connection, any immediately following slotting motion would not punch out the largest possible slot length. That in turn would unreasonably extend the time required for producing the slot, with the actual slotting throughput rate falling short of the nominally attainable maximum rate.

The presence of an angle of inclination referred to hereinbefore does not necessarily presuppose a rectilinear path for the longitudinal cut by the tool section involved. In the case for instance of a curved longitudinal cut the angle of inclination relative to the workpiece may be determined by approximation.

The design is tailored to the special features provided by the invention for producing the slot gate cut. Specifically, both the method and the machine of this invention provide for a gate-cutting phase that cuts around a strip of material whose length exceeds the distance, in the direction of the slot, between the transverse cutting edges of the tool sections while nevertheless permitting accommodation in the slotting tool in such fashion that it does not interfere with the slotting process. This accommodation of the punched-out strip material is made possible by s strip exit port provided on one hand of the tool sections. The free forward end of the "excessively long" strip of material, pointing in the forward feed direction, can dip into that port which removes it far enough from any proximity to the cutting edges of the tool sections.

The tool section provided with the exit port for the punched-out strip of material is positioned opposite a tool section mount on the machine in such a fashion that the material strip exit port on the wall of the tool section is clear of the tool section mount. This configuration of the tool section obviates the need for any special structural provisions on the tool section mount for adapting that mount to the special features of the slotting method as shown in this invention.

BRIEF DESCRIPTION OF THE ILLUSTRATED EMBODIMENT

The invention is explained in more detail by attached schematic illustrations in which FIG. 1 shows a sheet metal forming machine tool with interchangeable slotting tools;

Figure 1:
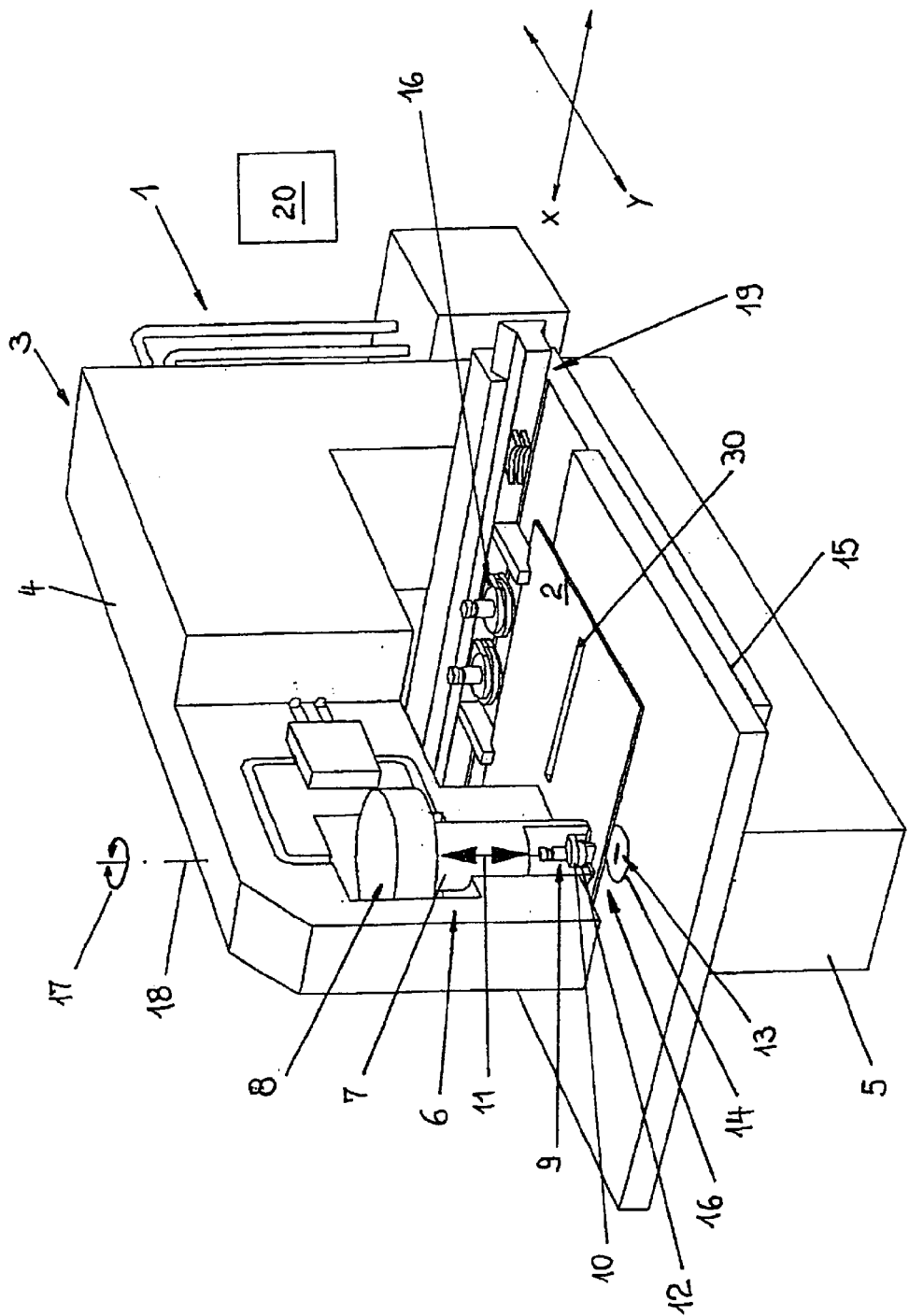
Figure 8:
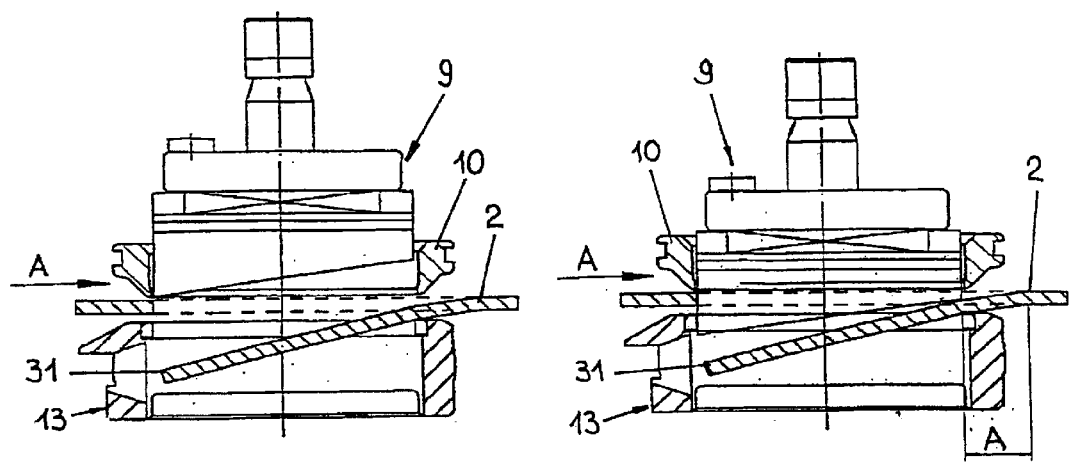
Figure 9:
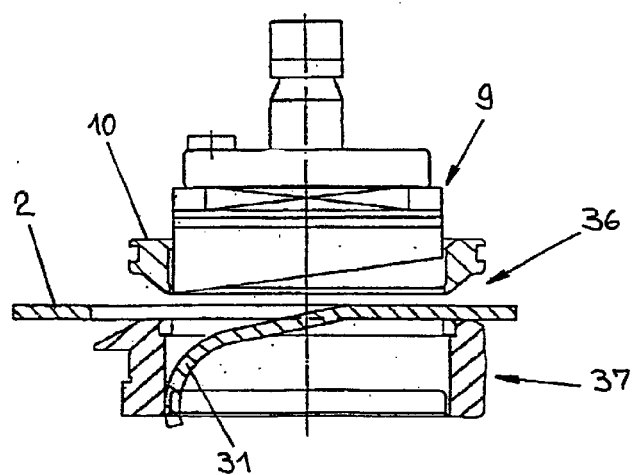

FIGS. 5/1 to 5/6 are schematic illustrations showing the progression of the gate-cutting phase in the operation of the machine tool of FIG. 1;

FIGS. 6/1 to 6/5 are schematic illustrations showing the progression of a working phase in the operation of the machine tool of FIG. 1;

FIGS. 7/1 to 7/3 are schematic illustrations showing the progression of a final finishing phase in the operation of the machine tool of FIG. 1;

FIGS. 8a and 8b are illustrations which compare the system of FIG. 5/5 and a similar system whose upper punch has a reduced length of stroke compared to that in FIG. 5/5; and FIG. 9 shows a second embodiment of a slotting tool for the machine tool of FIG. 1, in the operating mode illustrated in FIG. 5/3.

DETAILED DESCRIPTION OF THE ILLUSTRATED EMBODIMENTS

As indicated in FIG. 1, a machine 1 for the slotting of sheet metal, in this case a metal plate 2, encompasses a C-shaped frame 3. The latter is composed of an upper arm 4 and a lower arm 5. The open end of the upper arm 4 incorporates a punching station 6 with a ram 7. The ram 7 is part of a cam drive 8 by means of which an upper die with tool sections in the form of a punch 9 and a stripper 10 can be hydraulically moved up and down in the stroke direction 11 indicated by a bidirectional arrow. The punch 9 and the stripper 10 are interchangeably retained in a tool-section mount 12 of the ram 7. Together with a lower die in the form of a swage 13 interchangeably seated in a tool-section mount 14 of a workpiece table 15 on the lower arm 5, the punch 9 and the stripper 10 constitute a slotting tool 16. The tool section mount 12 on the ram 7 and the tool-section mount 14 on the workpiece table 15 can be synchronously rotated in the direction of a double arrow 17 around an axis of tool rotation 18 extending in the stroke direction 11.

Next to the workpiece table 15 on the lower arm 5 of the frame a conventional coordinate X-Y drive 19 is provided. This coordinate drive 19 serves in conventional fashion to move the object workpieces, in the case illustrated the metal plate 2, along a horizontal plane defined by the coordinate axes X and Y, relative to the punching station 6. Again in conventional fashion, the X-Y drive also serves for the queuing of workpieces and for the interchanging of slotting tools 16 at the punching station 6. A computer-based control unit 20 controls all functions of the machine 1. In particular, a stroke control for the cam drive 8 and a dual-purpose return-movement control and forward-feed control for the coordinate drive 19 are integrated into the computer-based controller 20.

Figure 2:
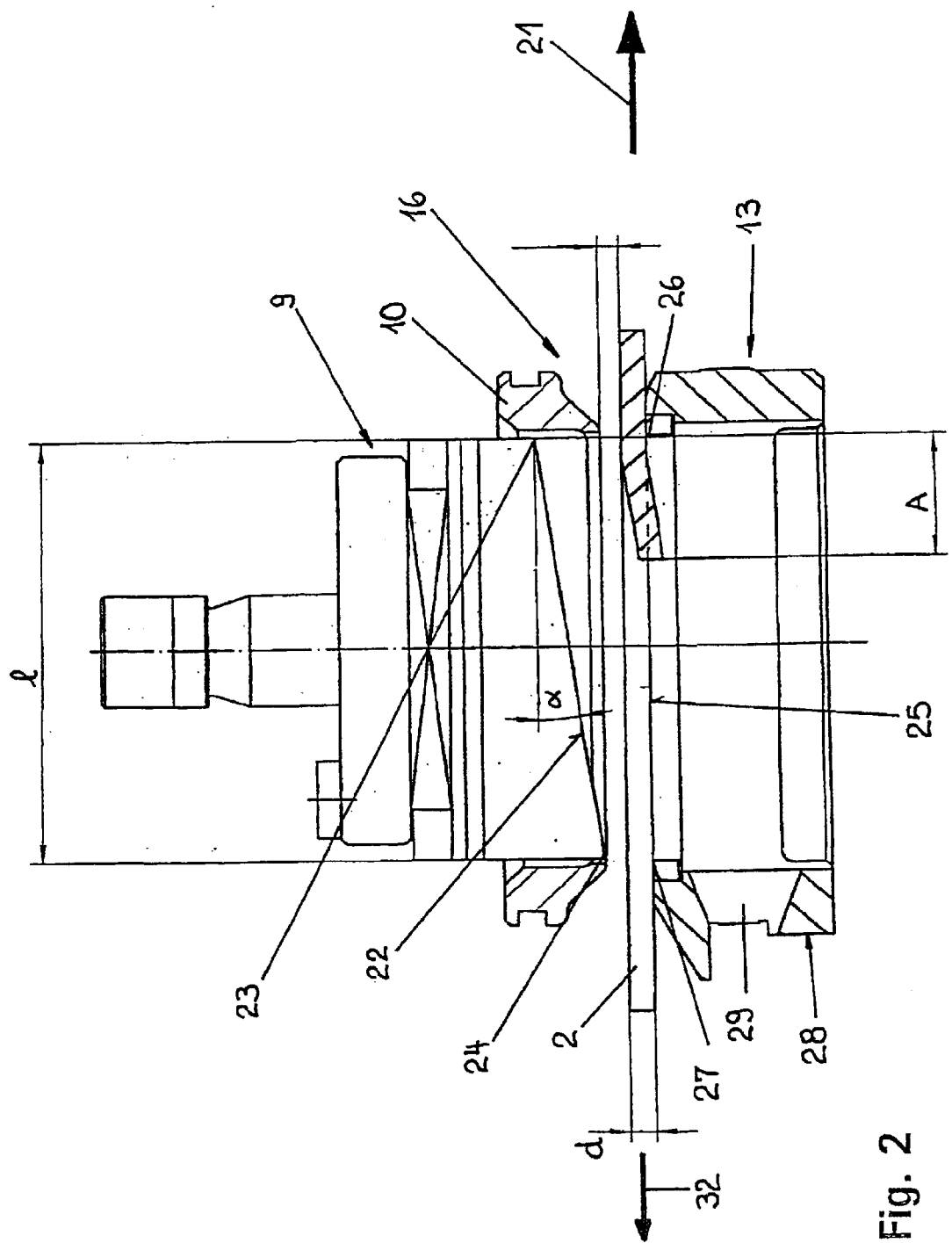
FIG. 2 shows a first design of a slotting tool for the machine tool of FIG. 1, comprising an upper die and a lower die or swage.

FIG. 2 shows details of the slotting tool 16. The punch 9 of the slotting tool 16 and its associated stripper 10 are both of a conventional design. As usual, the punch 9 has two longitudinal cutting edges 22 extending in the slot direction 21 and sloped upwards in that slot direction 21 relative to the metal plate 2 that is to be slotted. Extending between the longitudinal cutting edges 22 of the punch 9, transversely relative to and viewed in the slot direction 21, are a forward or leading cross-cutting edge 23 and a trailing cross-cutting edge 24. The advance direction 32 is opposite the slot direction 21.

The lower tool or die 13 as well is provided with longitudinal cutting edges 25 extending in the slot direction 21. Between these, transversely relative to the slot direction 21, extend a leading cross-cutting edge 26 and a trailing cross-cutting edge 27. The wall 28 of the die 13 on its side pointing in the advance direction 32 is provided with an exit port 29.

The maximum slot length attainable with the slotting tool 16 corresponds essentially to the approximately matching lengths of the longitudinal cutting edges 22, 25 on the punch 9 and the die 13 and is referred to as "l" in FIG. 2. In that FIG. 2 the thickness of the metal plate 2 is indicated by the character "d", the angle of inclination of the longitudinal cutting edges 22 on the punch 9 opposite the metal plate 2 is referred to as "α".

FIG. 1 shows the machine 1 after completion of a slot 30 in the metal plate 2. The operations preceding that machine status are depicted in FIGS. 3 to 7.

Figure 3:
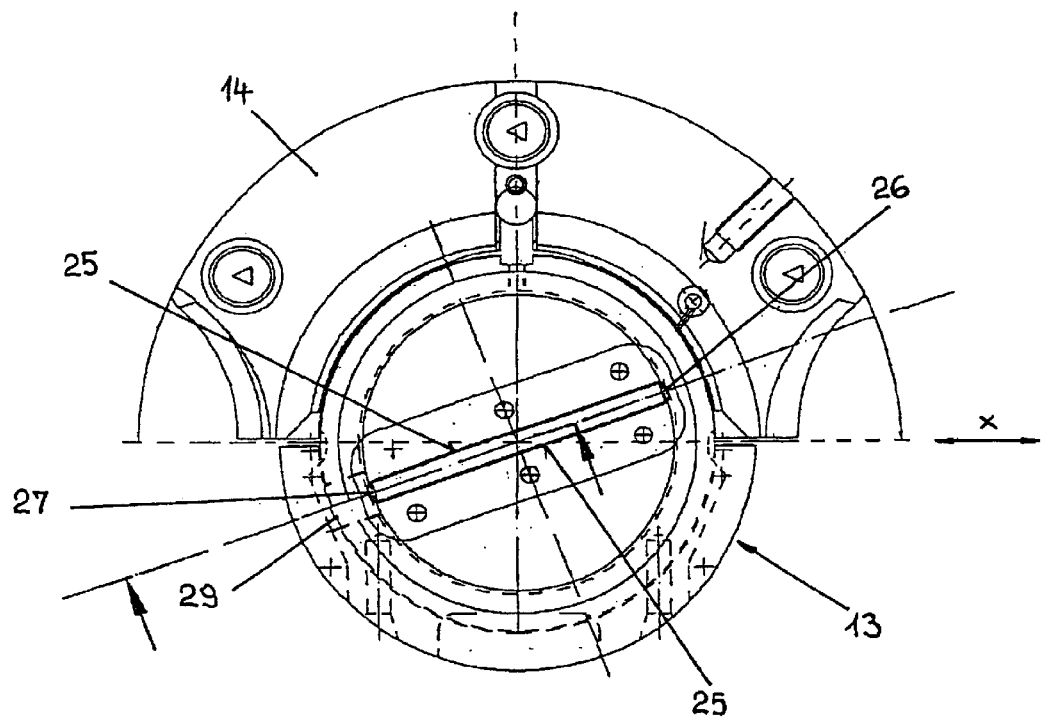
FIGS. 3 and 4 show the die of FIG. 2 as it is mounted in the machine tool of FIG. 1.

Before the actual punching process can begin, the punching station 6 must be equipped with the necessary slotting tool 16. To that end the appropriate slotting tool 16, on stand-by in a tool cartridge on the X-Y drive 19, is brought to the punching station 6 by a controlled movement of the X-Y drive 19 where the punch 9 and the stripper 10 are inserted in the tool-section mount 12 and the die 13 in the tool-section mount 14. The punch 9 and the stripper 10 as well as the die 13, once installed in the corresponding tool-section mount 12, 14, are rotated at an angle of about 20° relative to the coordinate X-axis. FIG. 3 shows that position for the die 13.

Figure 4:
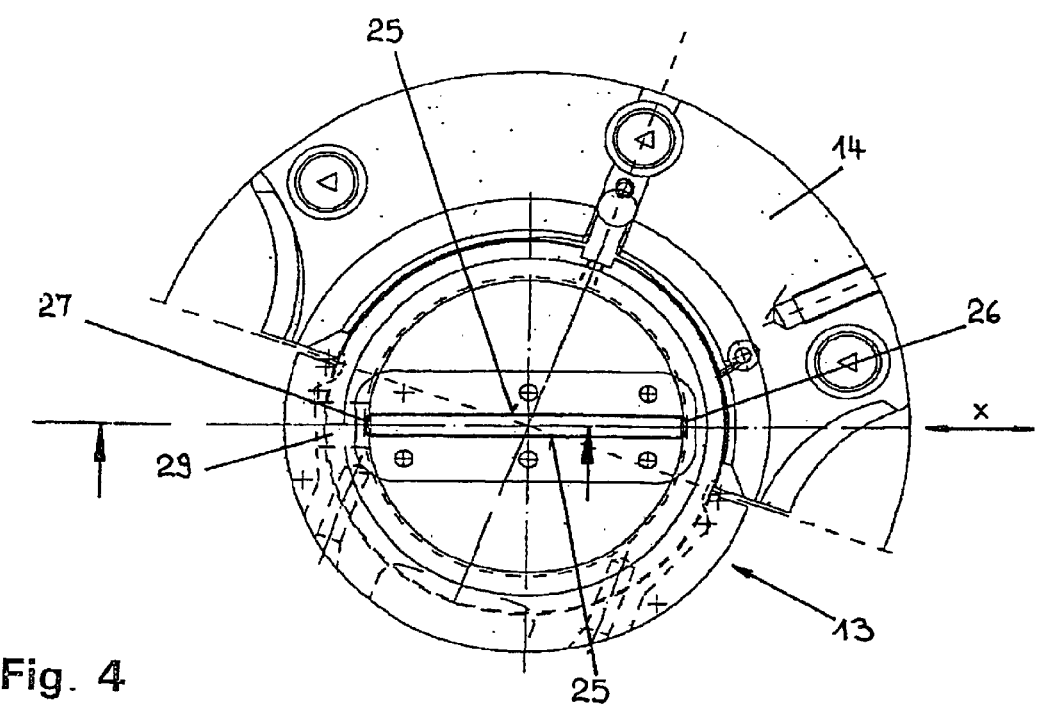

The computer-based controller 20 then rotates the ram 7 with the punch 9 and the stripper 10 as well as the tool-section mount 14 with the die 13 as shown in FIG. 3, clockwise until all tool components with their main axes are lined up in the direction of the coordinate X-axis. For the die 13, the machine status at that point is shown in FIG. 4. It is with that alignment of the punch 9, the stripper 10 and the swage 13 that the metal plate 2 is then punched. As can be seen in FIG. 4, the exit port 29 in the wall 28 of the die 13 is clear of the tool section mount 14.

Once the slotting tool 16 is installed and aligned, the metal plate 2 is guided by the X-Y drive 19 to its position adjacent the slotting tool 16 and inserted in the space between the punch 9 and the stripper 10 on one side and the die 13 on the other side (FIG. 5/1). In terms of the stroke direction 11, the punch 9 is in its home position. As the next step, a gate-slotting stroke produces a gate cut in the metal plate 2 (FIG. 5/2). In the process, the trailing cross-cutting edge 24 on the punch 9 and the trailing cross-cutting edge 27 on the die 13 cooperate to produce, in the slot direction 21, the rearward transverse boundary as well as the first part of the longitudinal borders of the slot 30, punching out a strip of material 31. Suitably controlled by the cam drive 8, the punch 9, as it performs the gate cut, only moves into the swage 13 far enough to leave at the end pointing in the slot direction 21 a connecting stem between the strip of material 31 and the remaining body of the metal plate 2.

After the gate cut is made, the punch 9 is raised into its home position and the X-Y drive 19 moves the metal plate 2 in controlled fashion by a feed length B in the advance direction 32 opposite the slot direction 21. This creates the situation depicted in FIG. 5/3. As the metal plate 2 is advanced, the strip of material 31, advanced together with the remainder of the metal plate 2, moves into the exit port 29 in the wall 28 of the die 13. Since that exit port 29 is clear of the tool-section mount 14, the strip of material 31 can pass through the exit port 29 unimpeded.

After the metal plate 2 has been advanced as described, the punch 9 is lowered again for another slotting stroke which extends the laterally punched-out section of the slot 30 in the direction 21 (FIG. 5/4). The stroke length selected for the punch 9 in this second slotting motion is the same as for the initial gate-slotting function.

After the second slotting stroke the punch 9 is again retracted into its home position. The metal plate 2 is moved in the reverse direction (in the slot direction 21) and thus against the advance direction 32 by a return length A as seen in FIG. 5/5. The return action is again provided by the X-Y drive 19 whose forward-feed control also doubles as the reverse-feed control. The return length A corresponds to the feed length B of the preceding forward movement. Upon the completed return movement of the metal plate 2, the strip of material 31, at a distance from its connection to the remainder of the metal plate 2, will be sitting on the leading cross-cutting edge 26 of the die 13 (FIG. 5/5). This is followed by the first cross-cutting stroke in which the leading cross-cutting edge 23 of the punch 9 and the leading cross-cutting edge 26 of the die 13 cooperate to cut the strip of material 31 free from the plate 2 (FIG. 5/6). For this cross-cutting operation, the cam drive 8 moves the punch 9 more deeply into the die 13 than in the two preceding slotting strokes.

In the gate-cutting stroke and the subsequent slotting stroke the slot 30 is punched out over a length that is greater than the maximum slot length L attainable with the slotting tool 16 in a cross-cutting stroke. In the example shown, the return length A corresponds to the distance between the rearward transverse boundary of the gated slot 30 and the trailing transverse cutting edges 24, 27 of the punch 9 and the swage 13 after the slotting stroke that follows the gate-cutting stroke. As a result, the metal plate 2, after having been returned (FIG. 5/5), will sit with the rearward boundary of the slot 30 at the level of the trailing cross-cutting edges 24, 27 of the punch 9 and the swage 13. This keeps the rearward transverse boundary of the slot 30 intact during the cross-cut stroke that follows, avoiding any undesirable rearward extension of the slot 30.

In terms of its magnitude, the return length A and thus, in this particular case, the feed length B during the gate cutting phase is determined as a function of the thickness of the metal plate 2 and of the angle of inclination ☐ of the longitudinal cutting edges 22 on the punch 9 relative to the metal plate 2, i.e.,:

$$A = \frac{2/3d}{\tan\alpha.}$$

The resulting value for the return length A ensures that the cross-cut executed on the laterally punched-out strip of material 31 after the return movement of the metal plate 2 is made at a sufficiently large distance from the connecting stem at the metal plate 2 and that, accordingly, the forward transverse boundary of the slot 30, viewed in the slot direction 21, is defined by the cross-cut on the laterally punched-out strip of material. It also ensures that the stem of the strip of material remaining in the slot direction 21 is kept very short and that, accordingly, a slotting stroke following the cross-cut stroke of the gate-cutting function overlaps with the laterally punched-out slot length to a minor extent only.

Following the operating state illustrated in FIG. 5/6 the punch 9 is moved back into its home position, which concludes the gate-cutting phase. This is followed by the operating phase shown in FIGS. 6/1 to 6/5.

In the operating phase, the X-Y drive 19 moves the metal plate 2 in the advance direction 32 by a feed length B, now corresponding to the maximum attainable slot length L, into its position shown in FIG. 6/1. After a slotting operation (FIG. 6/2) and subsequent return of the punch 9 the metal plate 2 is reversed, by the return length A, in the return direction i.e. slot direction 21 (FIG. 6/3). In this connection it is important to select the return length A in a way that, upon the return movement, the laterally punched out strip of material 31 is positioned next to the leading cross-cutting edges 23, 26 of the punch 9 and the die 13. In the example shown, the return length A of the operating or slotting phase matches the return length A of the gate-cutting phase. However, the feed length B of the operating phase exceeds the feed length B of the gating phase. This avoids a situation where, in the gate-cutting phase, a strip of material 31 is laterally punched out at too great a length that would interfere with the slotting process while at the same time making it possible in the operating phase to achieve a relatively substantial slotting progression as shown in each stroke of the tool.

The operating state shown in FIG. 6/3 is followed by a cross-cut (FIG. 6/4) upon the completion of which the punch 9 is retracted into its home position (FIG. 6/5). The magnitude of the strokes executed by the punch 9 during the operating phase is identical to that of the strokes in the gate-cutting phase. In contrast to the gate-cutting phase, each slotting stroke in the operating phase is followed by a cross-cutting stroke. The operating sequence shown in FIGS. 6/1 to 6/5 is repeated until the slot 30 has nearly reached its forward transverse boundary, viewed in the slot direction 21. The last cross-cut stroke in the operating phase severs the strip of material 31 in usual fashion at a distance from the stem connecting it with the remaining metal plate 2. That is followed by the final finishing phase illustrated in FIGS. 7/1 to 7/3.

From the operating state shown in FIG. 6/5, the X-Y drive 19 moves the metal plate 2 in the advance direction 32 far enough to align the forward boundary of the slot 30, viewed in the slot direction 21, with the mutually lined up and spaced leading transverse cutting edges 23, 26 of the punch 9 and the swage 13 (FIG. 7/1). That is followed by a cross-cut as the final stroke (FIG. 7/2). This cross-cut produces the final part of the slot 30 including its forward transverse boundary. It is only by this last cross-cut that a strip of material 31 is fully punched out from the plate, i.e. past the stem that connects it with the remaining body of the metal plate 2. The result is a slot 30 with high-quality cutting surfaces free of any tool marks.

Following a concluding return travel of the punch 9 (FIG. 7/3) the X-Y drive 19 can move the metal plate 2 into the position shown in FIG. 1.

FIG. 8a shows the conditions corresponding to FIG. 5/5. With the punch 9 in its home position, the metal plate 2 is moved in the reverse direction. However, as shown in FIG. 8, the metal plate 2 may also be reversed with the punch 9 in its lowered position as compared to FIG. 5/5. In the latter case, the preceding slotting stroke need be followed only by a relatively minor retraction of the punch 9.

FIG. 9 illustrates a slotting tool 36 which in addition to a punch 9 and a stripper 10 of the type shown in FIGS. 1 to 8 encompasses a die 37 that differs in design from the die 13 described above. For example, the die 37 does not have an exit port for the strip of material 31. Consequently, in an operating state corresponding to FIG. 5/3, the strip of material 31 is bent and deflected downward into the die 13. Other than that the functional progression is the same in the slotting tool 36 as that in the slotting tool 16.

Thus, it can be seen from the foregoing specification and attached drawings that the machine of the present invention provides high quality slotted workpieces. The machine tool is readily programmed to perform the novel method of the present invention utilizing appropriately configured and dimensioned tools.

Having thus described the invention, what is claimed is:

1. In a machine tool for the continuous multi-stroke slotting of plate-shaped workpieces, the combination comprising:

(a) a workpiece support;

(b) a slotting tool (16, 36) having upper and lower components disposed above and below the upper surface of the workpiece support, said slotting tool (16, 36) having tool sections (9, 13, 37) with two longitudinal cutting edges (22, 25) which extend in a slot direction (21) and feature at their longitudinal ends between them transverse cross-cutting edges (23, 24, 26, 27), with the longitudinal cutting edges (22) on one tool section (9) being sloped in the slot direction (21) along an incline relative to the workpiece;

(c) a first drive system for moving the upper slotting tool section relative to the lower slotting tool section and including a stroke controlled cam drive (8);

(d) a second drive system (19) by means of which the slotting tool (16, 36) and the workpiece (2) can be moved relative to each other in an advance direction (32);

(e) a drive control for said drive systems, said tool sections and workpieces being movable in the transverse direction of the workpiece by motions in the form of slotting strokes and at least one cross-cutting stroke so that each slotting stroke laterally cuts a strip of material (31) that leaves a stem connecting it in the slot direction (21) to the remainder of the workpiece (2) which stem is then severed in the cross-cutting stroke by the same tool sections (9, 13, 37), said tool sections being controllable to provide a gate-slotting function to produce the gate at a distance from the edge of the workpiece, said gate-slotting stroke is being followed by at least one slotting stroke, prior to the cross-cutting stroke to cut the workpiece over a length that exceeds the matching length (1) of the longitudinal cutting edges of the tool sections maximally attainable in the cross-cutting stroke, said drive control being operable between the motions of the tool sections (9, 13, 37) to move the workpiece and the slotting tool (16, 36) relative to each other in the feed direction (32) by means of the drive system (19), said drive control being programmed so that following the gate-cutting stroke and at least one subsequent slotting stroke, the slotting tool (16, 36) and the workpiece can be moved relative to each other by means of said second drive system in a return movement opposite the forward direction (32) and over a return length (A) that corresponds at a maximum to the slot length between a position of the cross-cutting edges (24, 27) of the tool sections (9, 13, 37), and proximate to the gate and trailing the other cross cutting edge as viewed in the slot direction in the slot following the subsequent slotting stroke, a rearward transverse boundary of the previously laterally cut section of the slot (30), and drive control being operable prior to the final stroke finishing the slot (30) in the gate cutting stroke to move the tool sections (9, 13, 37) relative to each other in the transverse direction of the workpiece by means of said cam drive (8) to execute a cross-cut stroke.

2. The machine tool in accordance with claim 1 wherein the process of the gate-cutting function and the minimum of one subsequent slotting stroke between the motions of the tool sections (9, 13, 37), includes movement of the workpiece and the slotting tool (16, 36) at least once relative to each other by means of the second drive system (19) in a forward movement in the forward direction (32) by a feed length (B) that corresponds to the return length (A) of the subsequent return movement prior to a cross-cutting stroke.

3. The machine tool in accordance with claim 1 wherein said drive control is operative control to effect movement as a function of the thickness of the workpiece to be slotted and of the angle at which the longitudinal cutting edges (22) of one of the tool sections (9) being sloped in the slot direction along the incline relative to the workpiece.

4. The machine tool in accordance with claim 3, wherein said drive control is operative to control said movement in the return direction so that $$A \geq \frac{1/4d}{\tan\alpha}$$

where

A=the return length, d=the thickness of the metal plate and

α=the angle of inclination of the longitudinal cutting edges (22) on one tool section (9) at which said longitudinal cutting edges (22) slope upwardly relative to the workpiece in the slot direction (21).

5. The machine tool in accordance with claim 3 wherein said drive control is operative to control said movement in the return direction so that $$A = \frac{2/3d}{\tan\alpha}$$

where

A=the return length, d=the thickness of the metal plate and

α=is the angle of inclination of the longitudinal cutting edges (22) on one tool section (9) at which said longitudinal cutting edges (22) slope upwardly relative to the workpiece in the slot direction (21).

6. The machine tool in accordance with claim 1 wherein the lower tool section has a wall with an exit port (29) into which the strip of material (31) being laterally cut out in the slotting strokes protrudes.

* * * * *